United States Patent [19]
Sandei et al.

[11] Patent Number: 5,657,683
[45] Date of Patent: Aug. 19, 1997

[54] HOT BEVERAGE BREWING APPARATUS

[76] Inventors: Pietro Sandei; Stefano Sandei; Ugo Sandei, all of Via de Ambris, 31A, 43100 Parma, Italy

[21] Appl. No.: 575,059

[22] Filed: Dec. 21, 1995

Related U.S. Application Data

[63] Continuation of Ser. No. 383,603, Feb. 1, 1995, abandoned, which is a continuation of Ser. No. 277,412, Jul. 18, 1994, abandoned, which is a continuation of Ser. No. 72,987, Jun. 7, 1993, abandoned.

[51] Int. Cl.⁶ ............................................. A47J 31/34
[52] U.S. Cl. ........................... 99/287; 99/288; 99/302 P
[58] Field of Search ................... 99/289 R, 287, 99/289 T, 289 D, 289 P, 279, 280, 281, 283, 286, 300, 302 R, 302 P, 288; 426/433

[56] References Cited

U.S. PATENT DOCUMENTS

| | | | |
|---|---|---|---|
| D. 332,199 | 1/1993 | Pomeroy | D7/309 |
| 3,266,410 | 8/1966 | Novi | 99/287 |
| 4,102,255 | 7/1978 | Gasparrini | 99/287 |
| 4,597,506 | 7/1986 | Eglise et al. | 221/6 |
| 4,796,521 | 1/1989 | Grossi | 99/287 |
| 4,797,296 | 1/1989 | Meier | 99/289 R |
| 4,885,986 | 12/1989 | Grossi | 99/289 R |
| 4,934,258 | 6/1990 | Versini | 99/289 R |
| 4,975,296 | 12/1990 | Newman | 426/433 |
| 5,103,716 | 4/1992 | Mikkelsen | 99/289 |
| 5,158,793 | 10/1992 | Helbling | 426/231 |

FOREIGN PATENT DOCUMENTS

| | | |
|---|---|---|
| 33657A | 11/1969 | Italy . |
| 46027A | 11/1975 | Italy . |
| 46851A | 6/1984 | Italy . |

*Primary Examiner*—Robert W. Jenkins
*Attorney, Agent, or Firm*—Dowrey & Associates

[57] ABSTRACT

A hot beverage brewing unit having an auxiliary boiler surrounding a stainless steel lined brewing chamber. The brewing unit includes a chamber block made of cast bronze and constitutes a second boiler for maintaining a sufficient volume of brewing water at the exact temperature in order to handle increased brewing frequency.

19 Claims, 1 Drawing Sheet

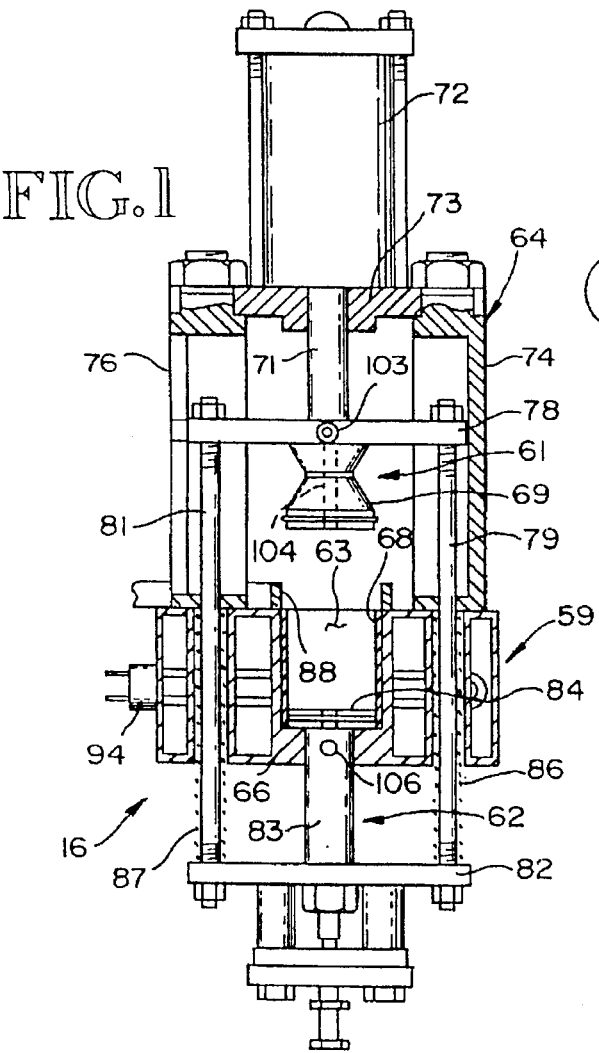
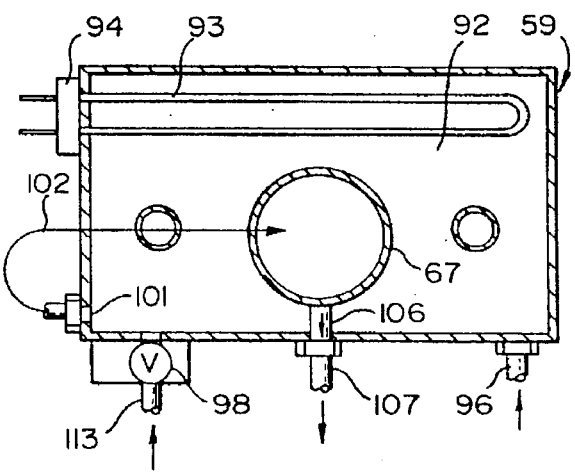

HOT BEVERAGE BREWING APPARATUS

This application is a continuation of Ser. No. 08/383,603, filed Feb. 1, 1995, now abandoned, which is a continuation of Ser. No. 08/277,412, filed Jul. 18, 1994, now abandoned, which in turn is a continuation of 08/072,987, filed Jun. 7, 1993, now abandoned.

BACKGROUND OF THE INVENTION

1. Field of the Invention

The present invention relates to improvements in apparatus for brewing hot beverages in brewing machines including coin operated vending machines and the like as well as a method of operating such apparatus in a manner which increases the utility and versatility of the machine. The apparatus is intended for use in brewing and dispensing espresso coffee.

2. Description of the Prior Art

Coin operated vending machines for dispensing a wide variety of beverages, including hot beverages which are mixed on an individual basis, are well known in the art. With the advent of sophisticated electronics and microprocessors in particular, such vending machines are capable of quite complex functions such as making selections from an array of available beverages, selecting separate ingredients and the amounts of each to be dispensed, e.g. cream, sugar and other flavorings. Additionally, the various functions of the machine in matching deposited monetary amounts with multiple selections made and performing certain diagnostic tests for machine malfunction and/or status are well understood. An example of such electronic controls for coin operated beverage machines may be found in U.S. Pat. No. 4,597,506 to David Eglise et al. Various improvements in brewing apparatus for compacting and charging the compacted ground coffee with hot water under pressure are also available in the art, see U.S. Pat. No. 5,103,716 to Per W. Mikkelsen as an example.

The present apparatus deals with improvements in existing coin operated vending machines of the type manufactured and marketed by Ducale Macchine da Caffè—di Sandei Ugo & C.s.n.c., Parma, Italy. The brewing unit is of the foaming general type disclosed in Italian Patent No. 46851A/84 issued to Ducale Macchine da Caffè; Italian Patent No. 33657A/69 issued to Ugo Sandei and Altobano Prampolini; and Italian Patent No. 46027A/75 issued to Ugo Sandei and Altobano Prampolini, respectively. The brewing mechanism in these prior patents has been improved by the present invention for greater efficiency and better overall performance of the machine.

SUMMARY OF THE INVENTION

The present invention provides improvements in features of the apparatus. The brewing apparatus which receives, compacts and charges the measured dose of ground coffee with hot water has been improved by the use of an additional boiler unit in a cast bronze brewing block adjacent the brewing cavity which accommodates increased brewing frequency. The addition of a stainless steel sleeve in the brewing chamber cavity strengthens the brewing chamber and decreases wear on the softer cast bronze brewing block, thereby accommodating increased coffee exploitation associated with double espresso brewing.

BRIEF DESCRIPTION OF THE DRAWINGS

FIG. 1 is a partially sectioned view of the brewing block and brewing cavity; and FIG. 2 is a sectional view showing the boiler cavity in the brewing block.

DESCRIPTION OF THE PREFERRED EMBODIMENT

The brewing unit 16 is shown most clearly in FIGS. 1 and 2 and generally includes the brewing chamber block 59, an upper piston assembly 61, a lower piston assembly 62, a brewing chamber 63 and a guide support structure 64 for mounting the upper piston for vertical reciprocation.

The body 66 of the block 59 may be a solid monolithic casting which is mounted by bolts or the like in a fixed position on the machine frame. The body 66 of the block 59 is provided with a vertical bore which defines the coffee brewing chamber 63. According to the present invention, the brewing chamber block 59 is made of cast bronze and, in addition to functioning as a brewing chamber, constitutes a second boiler for constantly maintaining a sufficient volume of coffee brewing water at the exact temperature in order to handle an increased brewing frequency. A primary water boiler, not shown, is provided which initially supplies hot water to the brewing block boiler. The bore of the brewing chamber 63 is fitted with a thin stainless steel sleeve 68 which vastly improves the function of the cast bronze brewing chamber. The stainless steel sleeve 68 not only provides a more sanitary surface required for food preparation purposes but also strengthens the walls of the comparatively soft cast bronze material to accommodate increased coffee exploitation. With the hard wear surface provided by the sleeve 68 there is decreased wear and tear on the surface of the cavity which increases the life of the brewing block and minimizes maintenance costs.

Referring to FIG. 1, the primary or upper piston 69 is carried on the lower end of the piston rod 71 of a double acting fluid cylinder 72. The fluid cylinder 72 is mounted on the cross bar 73 which extends between the upright post members 74 and 76 and may be provided with a pressure gauge if desired for monitoring the piston pressure. It will be understood that the cylinder 72 is a double acting fluid cylinder capable of raising and lowering the piston member 69 with valve means controlled by the electronic control system of the machine. An upper yoke 78 is connected to the piston member 69 and slidably engages the laterally spaced vertical guide rods 79 and 81 with the guide rods being mounted for reciprocation in suitable bores in the body of brewing block as illustrated in FIG. 1. A second yoke or bottom yoke 82 is rigidly connected to the bottom ends of the guide rods 79 and 81 and provides a mounting for the lower piston rod 83 which carries the lower piston 84 for reciprocation within the stainless steel sleeve 68. It will be understood that the piston rod 83 and guide rods 79 and 81 are fixed to the yoke 82 and reciprocate with the yoke. As illustrated in FIG. 1, the yoke 82 and lower piston 84 are biased to the bottom or lowered position of piston 84 by means of the compression springs 86 and 87 surrounding the guide rods 79 and 81 respectively. The upper yoke 78 is guided for vertical reciprocation within appropriate slots in the post members 74 and 76 as illustrated in FIG. 1. It will be understood that the yoke member 78 has a sliding connection with both of the guide rods 79 and 81 whereby further raising of the piston and yoke 78 as seen in FIG. 1 serves to raise the lower piston 84 to expel the coffee grounds from the brewing chamber 63 when the upper piston is in its fully raised position. This compound motion of the upper and lower pistons for compressing the shot of espresso and then expelling the spent grounds is well understood in the prior art.

When the spent and compressed charge of coffee grounds is expelled from the brewing cavity 63 by the lower piston, a sweep arm 88 located on the top surface of the brewing block serves to remove the coffee grounds which drop to the container. The coffee grounds removal mechanism is also a well known apparatus used in the prior art devices.

In the prior art, the brewing water is normally heated to a predetermined temperature in a boiler and then passed under pressure through the ground coffee held under compression by a piston in a brewing chamber. In some instances electrical resistance heating has also been provided to maintain the brewing chamber at an elevated temperature. The present invention departs from this concept and provides a secondary or additional water boiler chamber 92 in the body of the brewing block as seen in FIG. 2. The boiler chamber 92 is provided with a cal rod 93 which comprises an electrical resistance heating element submersed in the water within the boiler chamber. The cal rod has an electrical fitting 94 mounted on the boiler chamber block as seen in FIGS. 4 and 8. The brewing water is initially heated in a conventional or primary remote boiler, not shown, and pumped into the brewing block boiler 92 via the conduit 96. From the boiler 92, the heated brewing water exits the brewing block via the port 101. A flexible hose 102 carries the heated brewing water to the fitting 103 in the yoke 78 which is fixed to the piston 69. The brewing water passes through the piston head 69 via conduit 104 and, with the piston in the lowered coffee compacting position, passes through the ground coffee in the cavity 63. The brewed coffee is delivered through the conduit 106 which registers with a dispensing tube and into a beverage container or the like, not shown.

As aforementioned, the upper piston 69 is shown at the middle position in FIG. 1. At this point a single premeasured dose of ground coffee is delivered into the brewing chamber 63. As the piston continues on its downward travel, a the main pressure pump (not shown) pumps the heated water in the boiler 92 through the piston head and into the compacted ground coffee. Once the predetermined amount of water has been passed through the compacted coffee, the main pressure pump is deenergized. When the piston returns to the extreme raised position the yoke 78 contacts the stop members on the guide rods 79 and 81 to lift the lower piston 84 upwardly expelling the charge of coffee grounds from the brewing chamber. When the yoke 78 reaches the end of its travel, the sweep arm 88 is energized to remove the coffee grounds from the top surface of the block 59. When the piston 79 returns to the bottom rest position, the system is ready for recycling. The espresso brewing cycle may vary but usually takes from 12–20 seconds to complete.

After a preprogrammed amount of time has elapsed without serving any beverages, flushing water is provided via the flushing water conduit 113 which is connected to the external water system. The valve 98 is opened to direct the flushing water through the conduit 101, the flexible hose 102, the conduit 104 and finally into the brewing chamber 63 with the flushing water exiting through the conduit 107 and into a waste water container.

The present invention has been described with reference to a preferred embodiment. Modifications and alterations may become apparent to one skilled in the art upon reading and understanding this specification. It is intended to include all such modifications and alterations within the scope of the appended claims.

What is claimed is:

1. A beverage brewing apparatus comprising in combination;

a brewing block including a brewing chamber therein for receiving a predetermined quantity of brewing material, a brewed beverage outlet communicating with said chamber, a piston assembly for compressing said brewing material within the brewing chamber and introducing water under pressure into the brewing material to create a dispensing flow of brewed beverage from said chamber through said outlet, a water boiler cavity formed in said brewing block surrounding said chamber in heat transfer relation thereto, a water heater located within said boiler cavity, and a conduit extending between said boiler and said piston to direct hot brewing water to said piston.

2. A beverage brewing apparatus comprising in combination;

a brewing block formed from cast bronze metal including a brewing chamber therein for receiving a predetermined quantity of brewing material, a brewing beverage outlet communicating with said chamber, a piston assembly for compressing said brewing material within the brewing chamber and introducing water under pressure into the brewing material to create a dispensing flow of brewed beverage from said chamber through said outlet, said brewing chamber being formed in the body of said cast bronze metal and having side walls for receiving said piston, a stainless steel liner within said chamber conforming the side walls thereof, a water boiler cavity formed in said brewing block surrounding said chamber, a water heater located within said boiler, and a conduit extending between said boiler and said piston to direct hot brewing water to said piston.

3. A beverage brewing apparatus comprising in combination;

a brewing block formed from cast bronze metal including a brewing chamber therein for receiving a predetermined quantity of brewing material, a brewed beverage outlet communicating with said chamber, a piston assembly for compressing said brewing material within the brewing chamber and introducing water under pressure into the brewing material to create a dispensing flow of brewed beverage from said chamber through said outlet, a water boiler cavity formed in said brewing block surrounding said chamber, a water heater located within said boiler, and a conduit extending between said boiler and said piston to direct hot brewing water to said piston.

4. The apparatus of claim 3 wherein said brewing chamber is formed in the body of said cast bronze metal, and a stainless steel liner within said chamber conforming to the peripheral walls thereof.

5. In a hot beverage brewing machine including a primary water boiler and pump means for heating and supplying hot water to a brewing chamber, brewing apparatus comprising;

a brewing block including a brewing chamber therein for receiving a predetermined quantity of brewing material, a brewed beverage outlet communicating with said chamber, a piston assembly for compressing said brewing material within the brewing chamber and introducing water under pressure into the brewing material to create a dispensing flow of brewed beverage from said chamber through said outlet, an auxiliary water boiler cavity formed in said brewing block surrounding said chamber, a water heater located within said auxiliary boiler, a first conduit system connecting said primary boiler and pump means to supply hot water to said auxiliary boiler, and a second conduit system between said auxiliary boiler and said piston to direct hot brewing water to said piston.

6. The apparatus of claim 5 wherein said brewing block is formed from cast bronze metal.

7. The apparatus of claim 6 wherein said brewing chamber is formed in the body of said cast bronze metal, and a stainless steel liner within said chamber conforming to the peripheral walls thereof.

8. A beverage brewing apparatus comprising in combination;

a brewing block including a brewing chamber therein for receiving brewing material, brewed beverage outlet means communicating with said chamber, means forming a water boiler cavity in said brewing block surrounding said chamber in heat transfer relation thereto, water heating means located within said boiler, and conduit means for directing water under pressure from said boiler into the brewing material to create a dispensing flow of brewed beverage from said chamber through said outlet means.

9. The apparatus of claim 8 wherein said brewing chamber includes chamber walls, said boiler cavity being in direct heat transfer relation with said chamber walls, whereby said brewing chamber is heated to the same temperature as the water in said boiler and a sufficient volume of brewing water at the exact brewing temperature is maintained.

10. The apparatus of claim 9 including;

a piston assembly for compressing said brewing material within the brewing chamber and introducing water under pressure into the brewing material to create said dispensing flow of brewed beverage, said conduit means being connected between said boiler and said piston assembly to direct hot brewing water thereto.

11. The apparatus of claim 8 wherein said brewing block is a monolithic casting, said brewing chamber having a common wall with said boiler cavity.

12. The apparatus of claim 11 wherein said brewing block is formed from cast bronze metal.

13. The apparatus of claim 12 wherein said brewing chamber is a right circular cylinder with the side wall thereof completely surrounded by said boiler cavity.

14. The apparatus of claim 12 wherein said water heating means comprises;

electrical resistance heating elements mounted in the wall of said brewing block and extending into said boiler cavity so as to be submersed in and surrounded by the water within said boiler cavity.

15. The apparatus of claim 8 wherein said water heating means comprises;

electrical resistance heating elements mounted in the wall of said brewing block and extending into said boiler cavity so as to be submersed in and surrounded by the water within said boiler cavity.

16. A beverage brewing apparatus comprising in combination;

a brewing block including a brewing chamber therein for receiving brewing material, a brewed beverage outlet communicating with said chamber, a water boiler cavity formed in said brewing block surrounding said chamber in heat transfer relation thereto, a water heater associated with said boiler for heating water contained therein, and a conduit system for directing water under pressure from said boiler into the brewing material to create a dispensing flow of brewed beverage from said chamber through said outlet.

17. The apparatus of claim 16 wherein said brewing block is a monolithic casting, said brewing chamber having a common wall with said boiler cavity.

18. The apparatus of claim 17 wherein said brewing block is formed from cast bronze metal.

19. The apparatus of claim 18 wherein said brewing chamber is a right circular cylinder with the side wall thereof surrounded by said boiler cavity, and a stainless steel liner within said chamber conforming to the peripheral wall thereof.

* * * * *